United States Patent [19]

Wilkes

[11] Patent Number: 4,944,653
[45] Date of Patent: Jul. 31, 1990

[54] PLASTIC CENTRIFUGAL PUMP

[75] Inventor: Robert D. Wilkes, Little Rock, Ark.

[73] Assignee: Jacuzzi, Inc., Little Rock, Ark.

[21] Appl. No.: 172,577

[22] Filed: Mar. 24, 1988

[51] Int. Cl.⁵ .............................................. F04D 29/08
[52] U.S. Cl. ................................. 415/174.3; 415/170.1
[58] Field of Search ............... 416/133, 174 R, 241 R, 416/241 A; 415/170.1, 171.1, 174.2, 174.3, 34, 131, 133, 104

[56] References Cited

U.S. PATENT DOCUMENTS

| | | | |
|---|---|---|---|
| 1,884,974 | 10/1932 | Hurd | 415/174.3 |
| 1,889,397 | 11/1932 | Baumheckel | 415/174.3 X |
| 1,967,316 | 7/1934 | Meeker | 415/34 X |
| 2,206,488 | 7/1940 | Pavlecka et al. | 415/174.3 X |
| 2,214,243 | 9/1940 | Casson | 415/174.3 X |
| 2,250,311 | 7/1941 | Meyer | 415/173 R X |
| 2,671,406 | 3/1954 | Waller | 415/174.3 X |
| 2,689,528 | 9/1954 | Rainbow | 415/34 X |
| 2,922,374 | 1/1960 | Perish | 415/171.1 |
| 3,039,007 | 6/1962 | Williams et al. | 415/34 X |
| 3,228,342 | 1/1966 | Page | 416/231 A X |
| 3,354,529 | 11/1967 | James | 415/170 A X |
| 3,384,025 | 5/1968 | Chabica et al. | 415/173 R |
| 3,536,412 | 10/1970 | Beare et al. | 415/214 X |
| 3,540,833 | 11/1970 | Talamonti | 415/173 R X |
| 4,242,039 | 12/1980 | Villard et al. | 415/171.1 X |
| 4,752,183 | 6/1988 | Sakuraa | 415/131 X |

FOREIGN PATENT DOCUMENTS

| | | | |
|---|---|---|---|
| 22504 | 5/1936 | Australia | 415/34 |
| 966616 | 10/1950 | France | 415/173 R |
| 124900 | 5/1949 | Sweden | 415/173 R |
| 141390 | 11/1960 | U.S.S.R. | 415/34 |
| 552902 | 4/1943 | United Kingdom | 415/34 |
| 869049 | 5/1961 | United Kingdom | 415/173 R |
| 877878 | 9/1961 | United Kingdom | 415/173 R |

Primary Examiner—Edward K. Look
Assistant Examiner—John T. Kwon
Attorney, Agent, or Firm—Hill, Van Santen, Steadman & Simpson

[57] ABSTRACT

A pump for use with a hydrotherapy tub or spa is provided wherein the compression of the pump seal located between the impeller and the drive shaft opening is controllable such that a minimum compression and thus minimum heat generation occurs at a no-load or dry condition of the pump, but maximum compression and thus maximum sealing occurs at a full-load condition. The impeller is mounted on the drive shaft in an axially movable manner with the impeller eye facing the motor so that axial loading by the impeller under load is toward the motor thus compressing the interposed seal.

7 Claims, 1 Drawing Sheet

U.S. Patent  Jul. 31, 1990  4,944,653
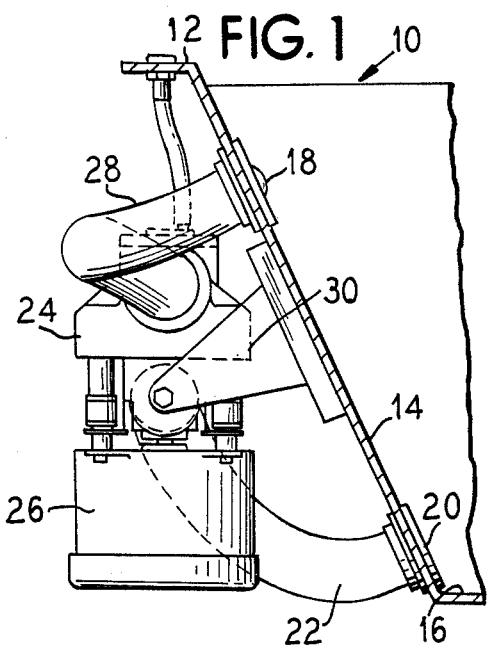
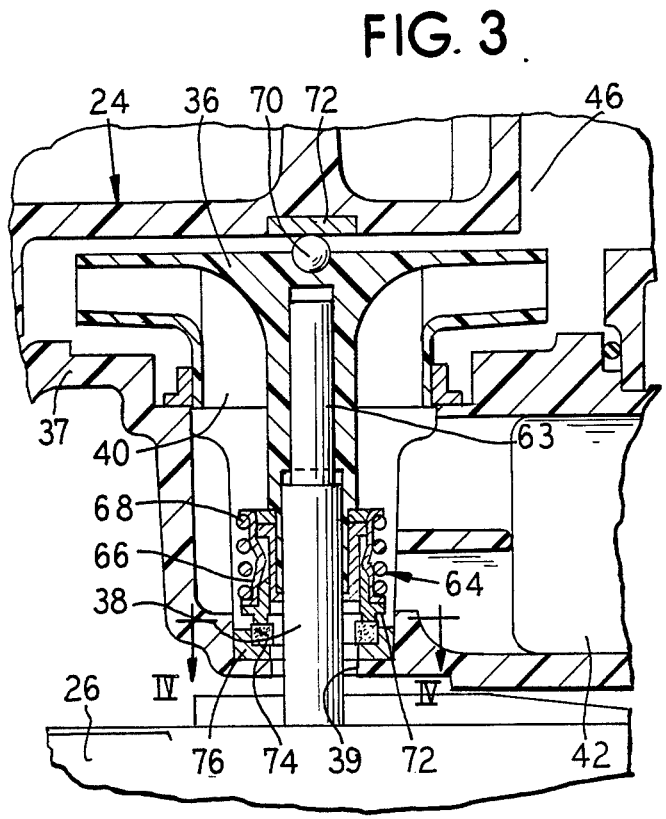
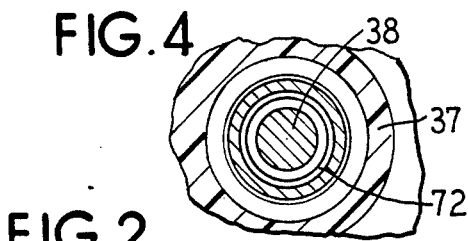
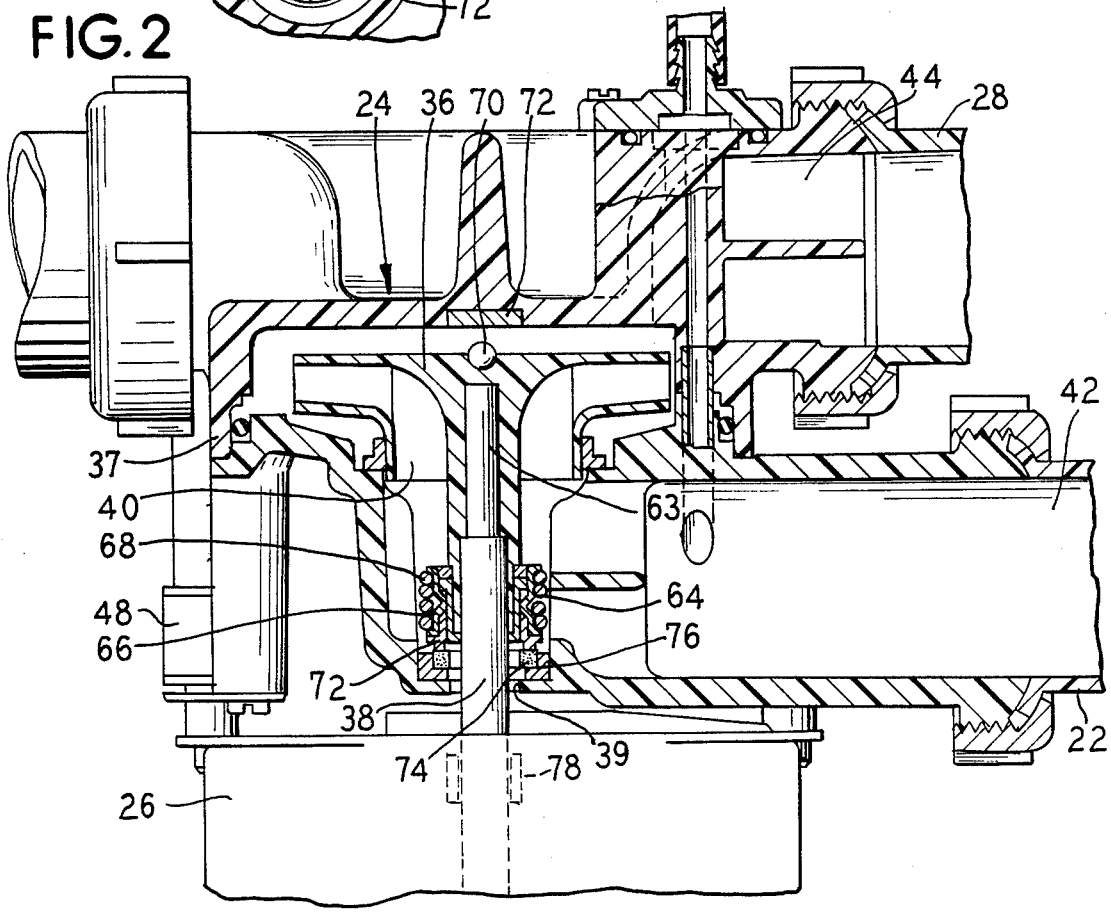

PLASTIC CENTRIFUGAL PUMP

BACKGROUND OF THE INVENTION

1. Field of the Invention

The present invention relates to pumps more particularly to a plastic centrifugal pump which may be subject to running in a dry condition.

2. Description of the Prior Art

In hydrotherapy spas, tubs, pools and other receptacles, water is continuously recirculated through a motor driven pump to be introduced into the receptacle through an inlet fitting which may include an air induction arrangement in order to provide a mixed stream of water and air into the receptacle. A return or suction fitting is also provided in the receptacle in order to have a continuous flow of liquid through the receptacle.

It is standard practice in small installations such as bath tubs to empty all of the water from the tub after each use, and this also occurs from time to time in spas and pools. In this condition of the tub, all of the water will also be drained from the pump, thus leaving the pump in a dry condition. It has also become more common to utilize plastic bodied pumps in these installations and, if such a pump is run dry, the pump and its seal may become damaged due to frictional heat build up at the seal area. Normally, this seal heat is dissipated by the pumped water, however when the pump is in a dry condition, there is only limited means to conduct the heat away from the pump and seal.

Several attempts have been made to prevent damage to plastic bodied pumps which may be operated in a dry condition to prevent such damage such as including electrical circuits that disable the motor if no load is sensed, such as would occur if the pump is run dry. Other solutions have been to include electrical circuits that disable the motor if a certain level of water is not sensed in the tub or utilizing electrical circuits that disable the motor if flow is not sensed in the plumbing network.

There have also been proposed use of a metallic heat sink and radiator interposed between the mechanical pump seal and the plastic housing, thus limiting the thermal exposure of the plastic, see for example U.S. Pat. Nos. 3,826,589 and (allowed Ser. No. 865,818). Finally, timers have been proposed that would limit the run time of the pump motor which would also serve to limit damage in the event of a dry run.

All of these techniques have drawbacks either in product cost, reliability or service requirements to keep them operable in this particular environment.

SUMMARY OF THE INVENTION

It is an object of the present invention to provide a plastic bodied centrifugal pump which can run in a dry condition without resulting in damage from mechanical seal heat.

To achieve this objective, the present invention provides a means for controlling the mechanical seal spring force which forces the seal components together so that the heat generated by the seal is also controlled. By controlling the spring force, seal wear under dry run conditions is also controlled.

To obtain this control, the pump impeller is carried on the motor shaft in a manner such that the impeller is rotationally fixed to the shaft but is free to move axially on the shaft. Further, the impeller eye or suction opening is oriented to face the motor. By controlling the distance of axial travel of the impeller on the shaft, the seal force can be controlled from a minimum selected value to a maximum selected value. If the pump is running dry, the seal spring will keep the seal forces at the minimum design level because there are no other forces capable of overcoming the seal spring. When the pump is pumping water, the pressure differential across the pump impeller produces axial thrust that compresses the mechanical seal spring to its maximum selected value. To react the seal spring force in the minimum force level condition, the impeller is fitted with a simple pivot bearing such as a low friction plastic ball engaging against a metal disc. The minimum seal force is chosen such as to produce a leak tight seal under the conditions of bath fill which is typically a few inches of water pressure. The maximum selected value is typically chosen to correspond to the manufacturer's recommendation for operating seal force. This is controlled by the compressed length of the seal spring and at this point the major portion of the pump impeller axial thrust is being reacted by the motor shaft bearings.

An alternate embodiment that has value to the bath tub application is to have the pump impeller axial thrust supported by the mechanical seal and hence they become equal in value, one being the force and the other being the reaction. This technique shunts the seal spring from controlling the seal force and relieves the motor shaft bearings from supporting the impeller thrust. In the bath tub application, the low head requirements for the pump results in an axial thrust value that is within the mechanical seal capabilities since it is designed for high head pumping units as well, being a standard commercial item. The advantage of this is a lower cost motor without a thrust requirement, and a quieter motor because sleeve bearings will replace ball bearings.

BRIEF DESCRIPTION OF THE DRAWINGS

FIG. 1 is a schematic illustration of a tub or spa including a hydrotherapy pump embodying the principles of the present invention.

FIG. 2 is a side sectional view of the pump and motor.

FIG. 3 is an enlarged view of the impeller and seal area of FIG. 2.

FIG. 4 is a top sectional view taken generally along the line IV—IV of FIG. 3.

DESCRIPTION OF THE PREFERRED EMBODIMENTS

In FIG. 1 there is illustrated a water receiving receptacle 10 which may be in the form of a hydrotherapy tub, spa or pool which is illustrated as having a rim 12 and a surrounding side wall 14 and a bottom wall 16. On one side of the receptacle there is a water inlet 18 which may be in the form of a hydrotherapy jet which can have an air inlet fitting (not specifically shown). Near the bottom wall of the receptacle there is illustrated a water outlet or suction fitting 20 which is connected by appropriate plumbing conduit 22 to a pump 24 driven by a motor 26. An output side of the pump 24 is connected by plumbing conduit 28 to the water inlet 18. The pump 24 is rigidly mounted by means of a bracket 30 directly to the side wall 14 of the receptacle 10.

FIGS. 2–4 illustrate in greater detail an embodiment of a hydrotherapy pump embodying the principles of the present invention where it is seen that the pump 24 has a rotating impeller 36 held with a pump casing or housing 37, the impeller being operably connected via a shaft 38 to the motor 26. The shaft 38 extends through an opening 39 in the pump casing. An eye or intake opening 40 of the impeller is directed toward the motor and communicates with a suction opening 42 of the pump to which the suction conduit 22 is attached. The pump also includes a discharge opening 44 to which the return conduit 28 is attached. The discharge opening 44 is on the pressurized side of the pump and communicates with the impeller 36 through a passage 46.

The motor 26 is secured to the pump 24 by a resilient mounting means 48 illustrated as being in the form of a plurality of resilient rubber mounts. The rubber mount serves as a noise and vibration isolator between the pump and motor. The motor 26 is thus resiliently suspended from the pump through the rubber mounts, which in the embodiment illustrated, comprise four separate mounts.

In the preferred embodiment the motor shaft 38 is not axially fixed to the impeller 36, but is only fixed in a rotational sense such as by a spline connection or similar type of keyed connection at 63 whereby the impeller will be rotatingly driven by the rotating shaft 38, but it is free to move axially on the shaft.

A resilient seal 64 is provided to prevent liquid in the inlet passage 42 from leaking out of the pump housing through the opening 39 where the motor shaft 38 enters the housing. The seal 64 includes an annular flexible portion 66, supported by a resilient coil spring 68, which rotates with the impeller 36 and normally holds the impeller in an elevated position (FIG. 3) away from the housing opening 39 such that a spherical bearing member 70, for example a low friction plastic wall, mounted on a top end of the impeller 36 engages a bearing plate 71 when the pump is not operating or is operating under a light load or no-load condition. A bottom end of the flexible seal member 66 presses down on an annular seal element 72, such as a carbon washer or ring, which rotates with the flexible seal member 66, the impeller 36 and the shaft 38. The annular seal element 72 presses against a fixed annular seal seat element 74, such as a rigid ceramic seat, which is held in the pump housing 37 by an elastic seat ring or boot 76. An engagement surface 77 is thus defined by the junction of the seal element 72 and the seat seal element 74.

As load increases, axial thrust of the impeller is directed toward the motor (downwardly in the orientation of FIGS. 2 and 3 and this axial thrust is absorbed by the spring 68 in the seal as the flexible portion 66 is axially compressed between the impeller and the pump housing. Such pressure on the seal member 64 effects a greater sealing between the rotating flexible portion of this seal and the seal seat 74. The configuration of the seal, strength and length of the spring 68 are selected such that a minimal engagement force between said seal element 72 and the seat seal element 74 is provided so that sufficient sealing occurs at the engagement surface 77 during no-load or light load conditions when the spring is not compressed, however, frictional forces and the generated heat are kept at a minimum. Increasing engagement sealing force occurs upon axial loading (axial movement of the impeller towards the seal, compressing the spring) as the load on the impeller increases which provides sufficient sealing at the engagement surface in all working conditions of the pump. The flexible portion 66 absorbs both axial and radial relative movement between the pump and motor.

With this particular pump construction and mounting arrangement, wherein the eye of the impeller faces toward the motor, resulting movement of the impeller toward the motor as load increases, and wherein a seal is utilized which absorbs the axial loading of the impeller, the motor shaft bearings need only support impeller radial loadings and no longer are required to support impeller axial loading. This permits the use of sleeve bearings 78 to be utilized in the motor as opposed to conventionally used ball bearings. Sleeve bearings are much quieter than ball bearings and assist in reducing the noise and vibration of the system and such a motor is less expensive than one which requires accommodation and reaction to thrust loading.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. A centrifugal pump comprising:
   a pump housing enclosing a rotatable impeller driven by a shaft of a motor, said housing having an opening therethrough for passage of said shaft, said impeller being axially movable on said shaft;
   a seal interposed between said impeller and said opening, said seal being interposed adjacent an intake area of said impeller, said seal comprising a first part rotatable with said impeller and a second part fixed to said housing at said opening, said two parts defining an engagement surface therebetween, said seal being compressible between said impeller and said housing, said seal having a resiliency sufficient to move said impeller away from said opening during no-load conditions;
   said impeller being oriented on said shaft such that said intake area faces said seal so that said engagement force increases as the load condition of the pump increases; and
   bearing means between said impeller and said housing on an opposite side of said impeller from said opening to limit movement of said impeller away from said opening and to facilitate rotation of said impeller, said bearing means comprising a spherical member held on said impeller and a plate secured to said housing engageable by said spherical member upon sufficient movement of said impeller away from said opening.

2. The centrifugal pump of claim 1, wherein said seal includes a spring member to provide said resiliency.

3. A centrifugal pump comprising:
   a pump housing enclosing a rotatable impeller driven by a shaft of a motor, said housing having an opening therethrough for passage of said shaft, said impeller being axially displaceably along said shaft;
   a resilient seal interposed between said impeller and said opening, said seal exerting a spring force between said impeller and said housing, said seal being interposed adjacent an intake area of said impeller;
   means for varying said spring force of said seal between a minimum at a no-load condition of said pump and a maximum at a full-load condition; and bearing means between said impeller and said housing on an opposite side of said impeller from said opening to limit movement of said impeller away from said opening and to facilitate rotation of said impeller, said bearing means comprising a spherical member held on one of said impeller and said housing and a planar surface at the other of said impeller and said housing engageable by said spherical member upon sufficient movement of said impeller away from said opening.

4. The centrifugal pump according to claim 3, wherein said impeller is mounted on said shaft in an axially movable manner with an impeller suction opening facing said housing opening.

5. The centrifugal pump according to claim 3, wherein said seal includes a flexible portion which is axially compressible relative to said shaft and which is supported by a spring axially compressible to provide said resiliency.

6. The centrifugal pump according to claim 3, wherein said seal is comprised of two parts, one part being rotatable with said impeller and one part being fixed to said housing.

7. The centrifugal pump according to claim 6, wherein said rotatable seal part is resilient and said fixed seal part is rigid.

* * * * *